(12) United States Patent
Yamakawa et al.

(10) Patent No.: US 7,705,104 B2
(45) Date of Patent: Apr. 27, 2010

(54) ADDITION CURABLE SILICON RESIN COMPOSITION FOR LIGHT EMITTING DIODE

(75) Inventors: Naoki Yamakawa, Takasaki (JP); Kei Miyoshi, Annaka (JP)

(73) Assignee: Shin Etsu Chemical Co., Ltd., Tokyo (JP)

( * ) Notice: Subject to any disclaimer, the term of this patent is extended or adjusted under 35 U.S.C. 154(b) by 900 days.

(21) Appl. No.: 11/461,895

(22) Filed: Aug. 2, 2006

(65) Prior Publication Data
US 2007/0032595 A1     Feb. 8, 2007

(30) Foreign Application Priority Data
Aug. 3, 2005     (JP)     ............... 2005-225716

(51) Int. Cl.
*C08G 77/12*     (2006.01)
(52) U.S. Cl. .......................................... 528/31; 528/32
(58) Field of Classification Search .................. 528/31, 528/32
See application file for complete search history.

(56) References Cited

U.S. PATENT DOCUMENTS

| | | | |
|---|---|---|---|
| 5,418,065 A * | 5/1995 | Fujiki et al. ................. | 428/451 |
| 2002/0161140 A1 | 10/2002 | Yoneda et al. | |
| 2004/0116640 A1 | 6/2004 | Miyoshi | |
| 2005/0006794 A1 * | 1/2005 | Kashiwagi et al. .......... | 257/788 |
| 2005/0061437 A1 | 3/2005 | Goto et al. | |

FOREIGN PATENT DOCUMENTS

| | | |
|---|---|---|
| EP | 1 424 363 A1 | 6/2004 |
| EP | 1 544 253 A2 | 6/2005 |
| JP | 11-1619 | 1/1999 |

OTHER PUBLICATIONS

U.S. Appl. No. 11/534,694, filed Sep. 25, 2006, Miyoshi.

* cited by examiner

*Primary Examiner*—Kuo-Liang Peng
(74) *Attorney, Agent, or Firm*—Oblon, Spivak, McClelland, Maier & Neustadt, L.L.P.

(57) ABSTRACT

An addition curable silicone resin composition for a light emitting diode is provided The composition includes an organopolysiloxane that includes a straight-chain segment represented by a formula:

$$-(R^1{}_2SiO)_n-$$

wherein, $R^1$ is an unsaturated aliphatic bonding-free monovalent hydrocarbon group, and n is an integer of 1 or greater, and a resin-like segment consisting of $R^2{}_3SiO_{1/2}$ units wherein, $R^2$ is a monovalent hydrocarbon group, an alkoxy group, or a hydroxyl group, $SiO_2$ units, and/or $R^2SiO_{3/2}$ units wherein, $R^2$ is as defined above, in which at least two of all the $R^2$ groups are alkenyl groups. The composition exhibits strong resistance to thermal shock, and is resistant to cracking even under severe temperature cycling.

18 Claims, No Drawings

US 7,705,104 B2

ADDITION CURABLE SILICON RESIN COMPOSITION FOR LIGHT EMITTING DIODE

BACKGROUND OF THE INVENTION

1. Field of the Invention

The present invention relates to an addition curable silicone resin composition for a light emitting diode (LED), and relates particularly to an addition curable silicone resin material that yields a cured product which exhibits excellent transparency, is ideal for protecting light emitting diode elements, altering or regulating wavelength, or acting as a lens component material, and exhibits favorable crack resistance even under conditions involving high temperature/low temperature cycling.

2. Description of the Prior Art

It is well known that when LEDs are activated and lit, a rapid rise in temperature occurs, subjecting the LED element to a thermal shock. Accordingly, when an LED element is turned on and off repeatedly, the LED element is exposed to severe temperature cycles.

Epoxy resins are generally used as the sealing materials for LED elements. However, because epoxy resins have a high elastic modulus, the bonding wires are subjected to stress and may break as a result of temperature cycling, and cracks may develop within the epoxy resin. Furthermore, as a result of the stress applied by the epoxy resin to the LED chip, there is also a risk of a deterioration in the light emission efficiency caused by destruction of the crystal structure of the semiconductor material. As a countermeasure to these problems, a method that uses a room-temperature curable silicone rubber as a buffer material, wherein the exterior of this rubber is then sealed with an epoxy resin, is now established as an accepted method. However, with this method, because the epoxy resin does not adhere to the silicone rubber, temperature cycling leads to peeling at the interface between the epoxy resin and the silicone rubber, and it is known that the light extraction efficiency deteriorates dramatically over time. The use of silicone resins as alternative materials to epoxy resins has also been proposed (patent references 1, 2 and 3). Because silicone resins exhibit comparatively superior heat resistance, weather resistance and color fastness when compared with epoxy resins, in recent years, LED examples that use silicone resins, primarily with blue LEDs and white LEDs, have become more prevalent. However, although these silicone resins have a lower elastic modulus than epoxy resins, their mechanical properties such as their flexural strength are inferior, meaning they suffer from a tendency for cracks to occur as a result of thermal shock generated during the turning on and off of the LED.

[Patent Reference 1] JP 11-1619 A
[Patent Reference 2] US 2002-0161140 A1
[Patent Reference 3] US 2004-0116640 A1

SUMMARY OF THE INVENTION

An object of the present invention is to address the problems outline above, and provide an addition curable silicone resin composition for a LED that exhibits strong resistance to thermal shock, and is resistant to cracking even under severe temperature cycling.

As a result of intensive research, the inventors of the present invention discovered that by employing an organopolysiloxane comprising a straight-chain segment with high flexibility and a resin-like segment with high rigidity as the base material of a silicone resin, the above object could be achieved, and they were thus able to complete the production of an addition curable silicone resin composition that is ideal as a sealing material for LED elements.

In other words, the present invention provides, as a solution for achieving the above object, an addition curable silicone resin composition for a light emitting diode, comprising:
(A) an organopolysiloxane comprising:
a straight-chain segment represented by a general formula (1):

$$—(R^1{}_2SiO)_n—\qquad(1)$$

(wherein, $R^1$ represents an unsubstituted or substituted monovalent hydrocarbon group that contains no unsaturated aliphatic bonds, and n represents an integer of 1 or greater), and
a resin-like segment, consisting of M units represented by a general formula: $R^2{}_3SiO_{1/2}$ (wherein, $R^2$ represents an unsubstituted or substituted monovalent hydrocarbon group, an alkoxy group, or a hydroxyl group), Q units represented by a formula: $SiO_2$, and/or T units represented by a formula: $R^2SiO_{3/2}$ (wherein, $R^2$ is as defined above), in which at least two of all the $R^2$ groups are alkenyl groups, (B) an organohydrogenpolysiloxane containing at least two hydrogen atoms bonded to silicon atoms within each molecule, in a quantity within a range from 5 to 50 parts by mass per 100 parts by mass of the organopolysiloxane of the component (A), (C) an effective quantity of an addition reaction catalyst, and (D) an organohydrogenpolysiloxane compound containing an epoxy group and/or an alkoxy group, in sufficient quantity to provide from 0 to 30 parts by mass per 100 parts by mass of a combination of said component (A) and said component (B).

An addition curable silicone composition of the present invention yields a cured product that is highly resistant to thermal shock, exhibits excellent adhesion to metals and plastics, and also displays excellent transparency. As a result, it is useful as a material for light emitting diode elements, and other optical devices or optical components.

DETAILED DESCRIPTION OF THE PREFERRED EMBODIMENTS

As follows is a more detailed description of the present invention. In the following description, "Me" represents a methyl group, and "Vi" represents a vinyl group. Unless stated otherwise, viscosity values refer to values measured at 23° C.

(A) Organopolysiloxane

An organopolysiloxane used as the component (A) comprises a straight-chain segment and a resin-like segment, as described above.

Examples of the resin-like segment include segments consisting of M units and Q units, segments consisting of M units and T units, and segments consisting of M units, Q units, and T units.

In the organopolysiloxane of the component (A), there are no restrictions on the configuration in which the straight-chain segment and the resin-like segment exist, and typical configurations include (a) configurations in which the two segments exist within separate molecules, and the component (A) is a mixture of those different molecules, and (b) configurations in which the two segments coexist within a single molecule. In addition, a third configuration (c) comprising a mixture of organopolysiloxane molecules of type (a) and organopolysiloxane molecules of type (b) is also possible.

In the case of type (b), the component may comprise uniform organopolysiloxane molecules in which the proportions of the two segments within each molecule are substantially equal, or may comprise a mixture of many different molecules with differing proportions of the two segments.

[Straight-Chain Segment]

The straight-chain segment is represented by the general formula (1), and is the soft segment within the organopolysiloxane of the component (A) responsible for imparting flexibility to the molecule. The group $R^1$ in the general formula (1) is an unsubstituted or substituted monovalent hydrocarbon group that contains no unsaturated aliphatic bonds, and n is an integer of 1 or greater.

Examples of the unsubstituted or substituted monovalent hydrocarbon group that contains no unsaturated aliphatic bonds represented by $R^1$ typically include groups of 1 to 12, and preferably 1 to 9, carbon atoms, and specific examples include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group, or decyl group; aryl groups such as a phenyl group, tolyl group, xylyl group, or naphthyl group; and aralkyl groups such as a benzyl group, phenylethyl group, or phenylpropyl group. Of these, a methyl group or ethyl group is preferred.

n is an integer of 1 or greater, and is preferably an integer within a range from 2 to 100, and even more preferably from 7 to 60.

[Resin-like Segment]

The "resin-like segment" used herein means a segment which has a three dimensional structure, and which does not contain a strait-chain siloxane unit (i.e., difunctional siloxane unit) but comprises at least one branched siloxane unit (i.e., trifunctional unit and/or tetrafunctional unit) as an essential unit(s). And the resin-like segment normally consists of M units represented by a general formula: $R^2_3SiO_{1/2}$ (wherein, $R^2$ represents an unsubstituted or substituted monovalent hydrocarbon group, an alkoxy group, or a hydroxyl group), and at least one member of Q units represented by a formula: $SiO_2$, and T units represented by a formula: $R^2SiO_{3/2}$ (wherein, $R^2$ is as defined above), in which at least two of all the $R^2$ groups are alkenyl groups, but does not contain D units described below.

Examples of the unsubstituted or substituted monovalent hydrocarbon groups represented by $R^2$ within this segment typically include groups of 1 to 12, and preferably 1 to 9, carbon atoms, and specific examples include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group, or decyl group; aryl groups such as a phenyl group, tolyl group, xylyl group, or naphthyl group; aralkyl groups such as a benzyl group, phenylethyl group, or phenylpropyl group; and alkenyl groups such as a vinyl group, allyl group, propenyl group, isopropenyl group, butenyl group, hexenyl group, cyclohexenyl group, or octenyl group. At least two of all the $R^2$ groups must be alkenyl groups, and the quantity of alkenyl groups within the $R^2$ groups is typically within a range from 0.01 to 1.0 mol per 100 g of the component (A), and preferably from 0.02 to 0.8 mol per 100 g of the component (A). Vinyl groups and allyl groups are particularly preferred as the alkenyl groups.

Furthermore, examples of the alkoxy groups typically include groups of 1 to 3 carbon atoms, and specific examples include a methoxy group, ethoxy group, n-propoxy group, or isopropoxy group.

The molar ratio of M units/(Q units and/or T units) within the resin-like segment is preferably within a range from 0.5 to 1.2, and even more preferably from 0.8 to 1.1. If this ratio of M units/(Q units and/or T units) is too small, then the number of cross-linking points within the molecule increases, and the thermal stability of the molecule becomes undesirably poor, whereas if the ratio is too large, the viscosity increases, causing an undesirable deterioration in the workability.

In the organopolysiloxane of the component (A), the ratio between the straight-chain segment and the resin-like segment is preferably such that the ratio of the quantity of diorganosiloxane units that constitute the straight-chain segment (so-called D units represented by the formula: $R^1_2SiO$) relative to the total quantity of siloxane units within the organopolysiloxane is within a range from 10 to 80 mol %, and even more preferably from 20 to 50 mol %. If this proportion of D units is too small, then the flexibility of the component (A) deteriorates, making the component undesirably fragile, whereas if the proportion is too large, then the hardness of the cured product decreases undesirably.

As follows are descriptions of representative examples of the case in which the organopolysiloxane of the component (A) comprises solely the type (a) configuration, and the case in which the organopolysiloxane comprises solely the type (b) configuration.

[Type (a)]

In a component (A) of this type, the straight-chain segment exists as a straight-chain diorganopolysiloxane that contains at least two alkenyl groups bonded to silicon atoms at the molecular terminals within each molecule, and the resin-like segment exists as a separate silicone resin molecule consisting of M units together with Q units and/or T units.

Diorganopolysiloxane Containing Straight-Chain Segment

This diorganopolysiloxane is represented by a general formula (2) shown below:

$$X-(R^1_2SiO)_{n-1}-Si(R^1)X \quad (2)$$

(wherein, $R^1$ and n are as defined above in relation to the general formula (1), and X is an alkenyl group).

Specific examples of this diorganopolysiloxane include:
$ViMe_2SiO(SiMe_2O)_m(SiViMeO)_nSiMe_2Vi$,
$Me_3SiO(SiMe_2O)_m(SiViMeO)_nSiMe_3$,
$ViMe_2SiO(SiMe_2O)_m(SiViMeO)_nSiMe_2Vi$, and
$Vi_3SiO(SiMe_2O)_m(SiViMeO)_nSiMeVi_3$ (wherein, m represents an integer from 0 to 100, and n represents either 0 or an integer from 1 to 10).

The viscosity of this diorganopolysiloxane is typically within a range from 60 to 100,000 mPa·s, although because a high viscosity is not particularly favorable from the viewpoint of workability, viscosity values of 1,000 mPa·s or less are preferred, and values of 100 mPa·s or less are particularly desirable.

Silicone Resin

The silicone resin consists of M units, together with Q units and/or T units, and in such cases, the molar ratio of M units/(Q units and/or T units) is preferably within a range from 0.5 to 1.2, and even more preferably from 0.9 to 1.1, and the resin also contains at least two alkenyl groups within each molecule. The quantity of these alkenyl groups is typically within a range from 0.01 to 1.0 mol/100 g, and is preferably from 0.02 to 0.8 mol/100 g.

Furthermore, if the molar ratio of M units/(Q units and/or T units) is too small, then the molecular weight of the silicone resin becomes overly high, resulting in an overly high viscosity and poorer workability, and consequently the ratio is preferably from 0.8 to 1.2, and even more preferably from 0.9 to 1.1.

If an attempt is made to increase the hardness of a cured product of a composition of the present invention by increasing the value of the ratio [resin-like segment/straight-chain segment], then although the hardness of the cured product of the composition increases, the cured product becomes more brittle, increasing the likelihood of cracking, and consequently the weight ratio [resin-like segment/organopolysiloxane of the component (A)] is preferably within a range from 0.8 to 0.1, and even more preferably from 0.5 to 0.2.

[Type (b)]

In a component (A) of this type, the straight-chain segment and the resin-like segment exist within a single molecule, forming a single organopolysiloxane molecule.

In this organopolysiloxane molecule, the straight-chain segment portion has a structure represented by the general formula (1) shown above. The resin-like segment portion has a structure consisting of M units, together with Q units and/or T units, as described above, and preferably also has a composition represented by an average composition formula (3) shown below:

$$R^2_p SiO_{(4-p)/2} \qquad (3)$$

(wherein, $R^2$ is as defined in relation to the general formula (2), the quantity of alkenyl groups within the $R^2$ groups is typically within a range from 0.01 to 1.0 mol, and preferably from 0.02 to 0.8 mol per 100 g of the component (A), and p is a positive number that satisfies $1 \leq p < 2$).

The organopolysiloxane of this type (b) is either a liquid or solid, and in the case of a liquid, preferably has a viscosity at 23° C. of at least 100 mPa·s.

The type (b) organopolysiloxane can be synthesized by conducting a hydrolysis and polymerization using either chlorosilanes, or in some cases chlorosilanes and chlorosiloxanes, as the monomers, which are selected in accordance with the targeted composition of the organopolysiloxane.

In other words, the resin-like segment is formed by hydrolysis and polymerization of a triorganochlorosilane (an M unit source), together with an organotrichlorosilane (a T unit source) and/or tetrachlorosilane (a Q unit source), and the straight-chain segment is formed by hydrolysis of a diorganodichlorosilane (a D unit source). If only a diorganodichlorosilane is used as the D unit source, then in many cases the length of the straight-chain segment will not extend, meaning an effective soft segment cannot be obtained, and consequently at least a portion of an α, ω-dichlorodiorganopolysiloxane (such as a material represented by the formula $Cl(R^1_2SiO)_{n-1}Si(R^1)_2Cl$ (wherein, $R^1$ is as defined in relation to the general formula (1), and n represents an integer of 1 or greater, and preferably an integer from 5 to 20)) is preferably used in combination with the diorganodichlorosilane.

In the above description, when a soft segment chain is introduced, if the combined total of the vinyldiorganochlorosilane (number of mols)+the organotrichlorosilane and/or tetrachlorosilane (number of mols)+$R^1_2SiO$ units (number of mols) is deemed 100 mol %, then by adding a quantity of $Cl(R^1_2SiO)_{n-1}Si(R^1)_2Cl$ (wherein, n is an integer of 1 or greater) that corresponds with a proportion for the $R^1_2SiO$ units (D units) that preferably falls within a range from 5 to 40 mol %, and even more preferably from 10 to 25 mol % (in other words, if the combined total of D unit sources derived from the diorganodichlorosilane and the α, ω-dichlorodiorganopolysiloxane is within a range from 5 to 40 mol %, and even more preferably from 10 to 25 mol %), then a silicone material with effective crack resistance is obtained. If the proportion of $Me_2SiO$ units exceeds 40 mol %, then there is a danger that the hardness of the resulting cured product may be less than the targeted hardness value.

The hydrolysis of the chlorosilanes described above is conducted in an organic solvent such as a mixture of toluene and water. Following hydrolysis, polymerization proceeds to some degree via a dehydrochlorination reaction, but this reaction alone does not raise the polymerization degree sufficiently, meaning the crack resistance is unsatisfactory. Accordingly, further condensation is performed under alkali conditions, thereby improving the crack resistance. Specifically, this alkali condensation may involve adding a 50% KOH aqueous solution to the post-hydrolysis toluene solution of the polymer, which has been washed with water to generate a neutral solution, using a quantity of 0.05 to 0.5 parts by mass (and preferably from 0.05 to 0.1 parts by mass) of the KOH aqueous solution per 100 parts by mass of the polymer, and then heating the resulting mixture and removing the water that is generated by azeotropic distillation with toluene. Subsequently, sufficient trimethylchlorosilane is added to provide a 2-fold equivalence relative to the quantity of KOH added within the 50% KOH aqueous solution, and neutralization is then achieved by adding a 20-fold equivalence of potassium acetate.

A type (b) organopolysiloxane may also be synthesized by polymerization of an alkoxysilane, but usually the organopolysiloxanes obtained by this method yield cured products with inferior crack resistance. Accordingly, chlorosilanes are preferred as the hydrolysis raw materials.

In a type (b) organopolysiloxane, the $R^2$ groups within the general formula (3) can be set as methyl groups, phenyl groups or cyclohexyl groups, depending on the refractive index required of the composition cured product.

(B) Organohydrogenpolysiloxane

An organohydrogenpolysiloxane containing at least two (typically from 2 to 200), and preferably three or more (for example, from 3 to 100) hydrogen atoms bonded to silicon atoms (namely, SiH groups) within each molecule is used as the component (B). The quantity of the hydrogen atoms is preferably within a range from 0.001 to 0.02 mol/g, and even more preferably from 0.005 to 0.017 mol/g.

Monovalent groups other than hydrogen atoms bonded to silicon atoms within the component (B) are typically substituted or unsubstituted monovalent hydrocarbon groups, and are preferably methyl groups or phenyl groups. In those cases where a material with a high refractive index is required following curing of the composition of the present invention, phenyl groups are particularly desirable.

The organohydrogenpolysiloxane of the component (B) can be represented by an average composition formula (4) shown below:

$$R^3_a H_b SiO_{(4-a-b)/2} \qquad (4)$$

(wherein, each $R^3$ represents, independently, an unsubstituted or substituted monovalent hydrocarbon group that contains no alkenyl groups, at least 30 mol % of all $R^3$ groups are methyl groups, a is a number that satisfies $0.7 \leq a \leq 2.1$, b is a number that satisfies $0.001 \leq b \leq 1.0$, and a+b represents a number that satisfies $0.8 \leq a+b \leq 3.0$).

The organohydrogenpolysiloxane functions as a cross-linking agent that undergoes cross-linking with the alkenyl groups of the component (A) via a hydrosilylation reaction, and also functions as a reactive diluent that dilutes the composition to a viscosity best suited to the intended application. The organohydrogenpolysiloxane must contain at least two, (typically from 2 to 200), and preferably three or more (for example, from 3 to approximately 100) hydrogen atoms bonded to silicon atoms (namely, SiH groups) within each molecule.

The viscosity at 25° C. of the organohydrogenpolysiloxane is preferably no more than 1,000 mPa·s (typically within a range from 1 to 1,000 mPa·s), and is even more preferably from 5 to 200 mPa·s.

Furthermore, the quantity of hydrogen atoms bonded to silicon atoms is preferably within a range from 0.001 to 0.02 mols, and even more preferably from 0.005 to 0.017 mols, per 1 g of the component (B).

Furthermore, if the hydrocarbon groups of $R^1$ and $R^2$ within the component (A) are alkyl groups such as methyl groups and ethyl groups, then the $R^3$ groups within the component (B) are preferably methyl groups, whereas if the $R^1$ and $R^2$ groups include phenyl groups, then at least 5 mol %, and preferably from 20 to 50 mol % of all the $R^3$ groups are preferably phenyl groups. If the refractive indices of the component (A) and the component (B) are significantly different, then turbidity may develop after mixing, making it impossible to obtain a transparent composition.

Specific examples of the organohydrogenpolysiloxane include 1,3,5,7-tetramethylcyclotetrasiloxane, tris(dimethylhydrogensiloxy)methylsilane, tris(dimethylhydrogensiloxy) phenylsilane, methylhydrogencyclopolysiloxane, cyclic copolymers of methylhydrogensiloxane and dimethylsiloxane, methylhydrogenpolysiloxane with both molecular chain terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane and methylphenylsiloxane with both terminals blocked with trimethylsiloxy groups, copolymers of methylhydrogensiloxane, diphenylsiloxane and dimethylsiloxane with both terminals blocked with trimethylsiloxy groups, copolymers of methylhydrogensiloxane, methylphenylsiloxane and dimethylsiloxane with both terminals blocked with trimethylsiloxy groups, copolymers of methylhydrogensiloxane and diphenylsiloxane with both terminals blocked with dimethylhydrogensiloxy groups, copolymers of methylhydrogensiloxane and methylphenylsiloxane with both terminals blocked with dimethylhydrogensiloxy groups, copolymers of methylhydrogensiloxane, dimethylsiloxane and diphenylsiloxane with both terminals blocked with dimethylhydrogensiloxy groups, copolymers of methylhydrogensiloxane, dimethylsiloxane and methylphenylsiloxane with both terminals blocked with dimethylhydrogensiloxy groups, polymers in which either a portion of, or all of, the methyl groups in the above compounds are substituted with other alkyl groups such as ethyl groups or propyl groups, or halogenated alkyl groups such as 3,3,3-trifluoropropyl groups, as well as compounds represented by general formulas (5) and (6) shown below:

$$R^3_3SiO[SiR^3(H)O]_cSiR^3_3 \quad (5)$$

$$\text{cyclic } [SiR^3(H)O]_d \quad (6)$$

(wherein, $R^3$ is as defined above, c represents an integer from 2 to 25, and preferably from 2 to 20, and d represents an integer from 4 to 8), and compounds represented by the general formulas shown below:

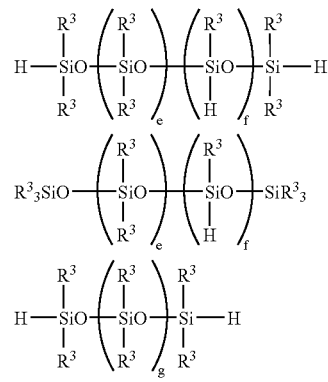

(wherein, $R^3$ is as defined above, e represents an integer from 5 to 40, f represents an integer from 5 to 20, and g represents an integer from 2 to 30).

Specific examples of the component (B) also include compounds represented by the structural formulas shown below.

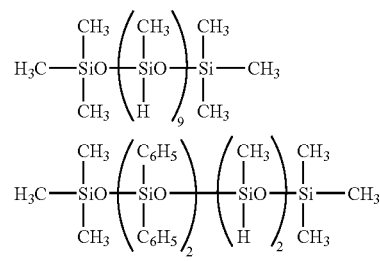

The blend quantity of the component (B) is preferably sufficient to generate a molar ratio of hydrogen atoms bonded to silicon atoms within the component (B) relative to the total quantity of alkenyl groups bonded to silicon atoms within the composition that falls within a range from 0.5 to 4.0, and even more preferably from 0.7 to 2.0, and most preferably from 1.2 to 1.6. However, in those cases where, in addition to the component (B), other components containing hydrogen atoms bonded to silicon atoms also exist (such as the optionally added component (D) described below), the molar ratio of the total number of silicon atom-bonded hydrogen atoms within the composition relative to the total quantity of silicon atom-bonded alkenyl groups within the composition preferably falls within the above range, that is, within the range from 0.5 to 4.0, and even more preferably from 0.7 to 2.0, and most preferably from 1.2 to 1.6. In those cases where, in the manner described above, other components with hydrogen atoms bonded to silicon atoms exist in addition to the component (B), the proportion of silicon atom-bonded hydrogen atoms derived from the component (B), relative to the total quantity of silicon atom-bonded hydrogen atoms across all the components containing hydrogen atoms bonded to silicon atoms, is preferably at least 60 mol %, and even more preferably 70 mol % or higher. If this molar ratio of silicon atom-bonded hydrogen atoms relative to silicon atom-bonded alkenyl groups is too large or too small, then the cured product becomes more prone to cracking depending on the shape of the product.

The component (B) may be used either alone, or in combinations of two or more different compounds.

(C) Addition Reaction Catalyst

Any of the conventional catalysts known to have a catalytic action in promoting hydrosilylation reactions can be used as the addition reaction catalyst, and representative examples include platinum-based, rhodium-based, and palladium-based catalysts. Generally, chloroplatinic acid or modified products thereof are used. Because the present invention relates particularly to electronics applications, a low-chlorine catalyst is preferred, and the use of catalysts that have been modified using either divinyltetramethyldisiloxane or divinyldiphenyldimethyldisiloxane from which the chlorine fraction has been removed is particularly preferred. The quantity added of the catalyst need only be a so-called "effective quantity", although there are no particular restrictions on the quantity. Specifically, considering the cost of the material, a quantity equivalent to no more than 50 ppm is typical, and quantities of no more than 20 ppm are particularly preferred. However, if this quantity is too low, then the composition becomes prone to curing inhibition effects, and consequently the quantity is typically at least 2 ppm.

Component (D)

The organohydrogenpolysiloxane compound containing an epoxy group and/or an alkoxy group of the component (D) is added as an adhesion improver where required, and imparts self-adhesiveness to the composition of the present invention. In those cases where a composition of the present invention is used as an LED sealing material, this component is typically used for improving the adhesion of the composition to the resin case or metal on which the LED chip is mounted.

The organohydrogen compound of the component (D) contains one or more (typically from 1 to 20, and preferably from 2 to 10) hydrogen atoms bonded to silicon atoms (SiH groups), and also contains organic groups containing an alkoxy group bonded to a silicon atom and/or an epoxy group bonded to a silicon atom. This organohydrogen compound typically has a straight-chain or cyclic siloxane structure containing from 2 to 30, and preferably from 4 to 20, silicon atoms.

Examples of the alkoxy group include a methoxy group, ethoxy group, propoxy group, isopropoxy group, butoxy group, sec-butoxy group, or tert-butoxy group, and this alkoxy group may be either bonded to a silicon atom that constitutes a siloxane structure (Si—O—Si), or may be parts of an alkoxysilyl group in which the alkoxy group is bonded to a silicon atom that constitutes a siloxane structure via an alkylene group. Furthermore, the epoxy group-containing organic group is a group in which the epoxy group is bonded to a silicon atom via a hydrocarbon group (that may also include an ether linkage oxygen atom), and suitable examples include the groups shown below.

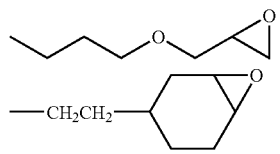

Specific examples of the component (D) include the compounds shown below. (In the following formulas, Me represents a methyl group.)

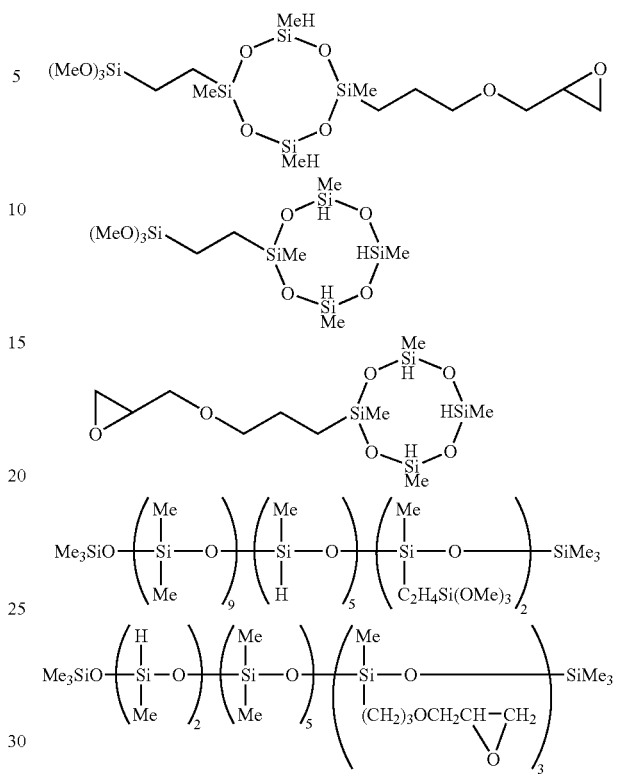

The blend quantity of the component (D) is preferably within a range from 0 to 30 parts by mass, and even more preferably from 3 to 15 parts by mass, per 100 parts by mass of the overall component (A).

Other Components

In addition to the components (A) through (C) described above, other components besides the component (D) may also be added to the composition of the present invention if required. For example, addition reaction retarders for suppressing the curability and enhancing the pot life, and addition reaction retardants containing a straight-chain or cyclic alkenyl group may be added, provided such addition does not impair the effects of the present invention.

Furthermore, inorganic fillers such as fumed silica may also be added for improving the strength, provided such addition does not adversely affect the transparency, and if required, other additives such as wavelength regulators, dyes, pigments, flame retardants, heat resistance improvers, and antioxidants may also be added.

Although there are no particular restrictions on the curing conditions for the above composition, the curing temperature is preferably within a range from 100 to 150° C., and heating is typically conducted for approximately 30 to 180 minutes.

The cured product obtained on curing the composition of the present invention preferably exhibits a Shore A hardness of at least 75 in order to prevent damage caused by external stresses, and a Shore D hardness value of 40 or greater is even more desirable.

EXAMPLES

As follows is a description of specifics of the present invention based on a series of examples and comparative examples, although the present invention is in no way limited by these examples. Unless stated otherwise, "parts" refers to parts by mass.

Reference Example 1

An Example Using a Type (a) Component (A)

A 50% xylene solution of a silicone resin formed of siloxane units represented by the formulas $Me_3SiO_{1/2}$, $ViMe_2SiO_{1/2}$ and $SiO_{4/2}$, and with a molar ratio of the combination of the $Me_3SiO_{1/2}$ units and $ViMe_2SiO_{1/2}$ units relative to the $SiO_2$ units of 0.95 was stripped for one hour at 120° C. and 15 mmHg, yielding a silicone resin (as a 50% by mass xylene solution) in which the vinyl group content of the resin solid fraction was 0.08 mol/100 g, and 100 parts of this silicone resin (50% by mass xylene solution) was then mixed with 50 parts of a dimethylpolysiloxane with both terminals blocked with vinyl groups and with a viscosity at 23° C. of 60 mPa·s. The solvent was removed from the resulting mixture by heating for one hour at 120° C. and 15 mmHg, thereby yielding a base polymer. To 100 parts of this base polymer were added 3 parts of tetramethyltetravinylcyclotetrasiloxane, 7 parts of a methyihydrogensiloxane represented by an average molecular formula shown below:

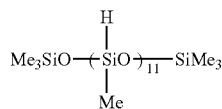

and 5 parts of an epoxy group-containing hydrogensiloxane represented by a formula (7) shown below:

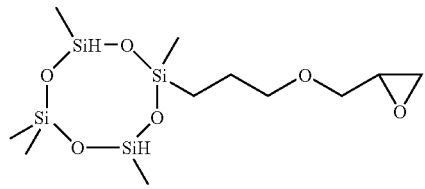

(7)

and the resulting mixture was stirred until uniform, thereby yielding a transparent liquid mixture. To this liquid mixture was added a platinum complex catalyst containing divinyltetramethyldisiloxane ligands, in sufficient quantity to provide 10 ppm (on a mass basis) of platinum atoms, and the mixture was then stirred to generate a uniform composition.

The composition was cured by heating at 100° C. for one hour and then at 150° C. for a further one hour, yielding a colorless, transparent resin cured product.

Measurement of the Shore A hardness of the cured product revealed a hardness of 75.

Reference Example 2

An example using a type (a) Component (A)

With the exception of mixing 25 parts of the aforementioned dimethylpolysiloxane with 150 parts of the aforementioned silicone resin (the 50% by mass xylene solution), a composition was prepared in the same manner as the reference example 1, and curing of this composition under the same conditions yielded a colorless, transparent resin cured product.

Measurement of the Shore D hardness of this cured product revealed a hardness of 50.

Reference Example 3

An example using a type (a) Component (A)

With the exception of mixing 20 parts of the aforementioned dimethylpolysiloxane with 160 parts of the aforementioned silicone resin (the 50% by mass xylene solution), a composition was prepared in the same manner as the reference example 1, and curing of this composition under the same conditions yielded a colorless, transparent resin cured product.

Measurement of the Shore D hardness of this cured product revealed a hardness of 59.

Comparative Example 1

An example using a type (a) Component (A)

With the exception of replacing the 100 parts of the base polymer, prepared by adding 50 parts of the aforementioned dimethylpolysiloxane to 100 parts of the aforementioned silicone resin (the 50% by mass xylene solution), with 100 parts of only the dimethylpolysiloxane, namely the dimethylpolysiloxane with both terminals blocked with vinyl groups and with a viscosity at 23° C. of 60 mPa·s, a composition was prepared in the same manner as the example 1, and curing of this composition under the same conditions as the reference example 1 yielded a colorless, transparent rubber-like cured product.

Measurement of the Shore A hardness of this cured product revealed a hardness of 50.

Comparative Example 2

200 parts of the same silicone resin (the 50% by mass xylene solution) as used in Reference Example 1 was mixed with 17.5 parts by mass of the aforementioned methylhydrogensiloxane represented by the formula: $Me_3SiO(MeHSiO)_{11}SiMe_3$, and the mixture was stripped for one hour at 120° C. and 15 mmHg, yielding a base polymer. To 117.5 parts by mass of this base polymer were then added 3 parts of tetramethyltetravinylcyclotetrasiloxane and 5 parts of the epoxy group-containing hydrogensiloxane represented by the formula (7), and the resulting mixture was stirred until uniform, thereby yielding a transparent liquid mixture.

A catalyst was then added to the liquid mixture in the same manner as the reference example 1 to prepare a composition, and the composition was cured in the same manner as the reference example 1, yielding a colorless, transparent resin cured product.

Measurement of the Shore D hardness of this cured product revealed a hardness of 61.

Evaluations

The crack resistance and adhesion of the compositions obtained in the reference examples 1 to 3 and the comparative examples 1 and 2 were evaluated using the following methods. The results are shown in Table 1.

Method of Testing Crack Resistance of Cured Products

The crack resistance of the cured products obtained in the reference examples and comparative examples was measured using the method described below. For each of the compositions, a washer with a diameter of approximately 7 mm was placed inside a 25 g wide-necked transparent glass bottle, and 5 g of the composition was poured into the bottle and then cured by heating inside a dryer at 100° C. for one hour and then at 150° C. for a further one hour. Following removal from the dryer and cooling, the cured product was subjected to 5 cycles of a thermal shock test in which each cycle involved [30 minutes standing at −40° C. →30 minutes standing at 120° C.]. The cured product was then inspected visually for evidence of cracking. The evaluation was conducted based on the following criteria.

O: no cracking had occurred
Δ: minor cracking occurred near the washer
x: large cracks occurred Method of Testing Adhesion The adhesion of the compositions obtained in the reference examples and comparative examples was measured using the method described below.

Each composition was placed on top of a PPA (polyphthalamide resin) test piece, and then cured by heating inside a dryer at 100° C. for one hour and then at 150° C. for a further one hour. The strength of the adhesion of the resulting cured product to the PPA was measured using a method in which a razor blade was used to cut through the structure in a direction perpendicular to the cured product layer and the PPA layer, and a spatula was then used to scratch the cut cross-sectional surface, and the adhesion was evaluated based on the following criteria.

O: adhesion across the entire surface, with no areas of separation between the cured product and the PPA piece
Δ: partial separation occurred between the cured product and the PPA piece
x: separation occurred between the cured product and the PPA piece across the entire surface condensation reaction at 100° C., neutralization was conducted by adding 0.1 g of trimethylchlorosilane and 1.0 g of potassium acetate. In this manner, and based on the added siloxane units, a solution of an organopolysiloxane with an average composition represented by the formula: $(C_6H_5)_{0.55}(CH_2=CH)_{0.2}(CH_3)_{0.9}SiO_{1.08}$ was obtained. The solvent was removed from the organopolysiloxane solution by heating at 80° C. and 15 mmHg for one hour, and to 100 parts of the resulting polymer (which even when free of solvent, was a liquid silicone resin at 80° C.) were added 24 parts of a cross-linking agent represented by an average molecular formula shown below (a quantity sufficient to yield a ratio (molar ratio) of [total SiH groups/total vinyl groups] within the composition=1):

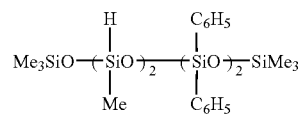

and 10 parts of an adhesion-imparting component represented by a formula (8) shown below, thus yielding a transparent liquid mixture.

TABLE 1

| Component/parts | | Reference Example 1 | Reference Example 2 | Reference Example 3 | Comparative example 1 | Comparative example 2 |
|---|---|---|---|---|---|---|
| Component/parts | Dimethylpolysiloxane | 50 | 25 | 20 | 100 | |
| | Silicone resin | 50 | 75 | 80 | | 100 |
| | (ViMeSiO)$_4$ | 3 | 3 | 3 | 3 | 3 |
| | Methylhydrogensiloxane | 7 | 10 | 15.5 | 5 | 17.5 |
| | Epoxy group-containing hydrogensiloxane | 5 | 5 | 5 | 5 | 5 |
| Total SiH groups/total vinyl groups within composition (molar ratio) | | 1.3 | 1.3 | 1.3 | 1.3 | 1.3 |
| Hardness | | | | | | |
| D: Shore D hardness A: Shore A hardness | | A: 85 | D: 50 | D: 59 | A: 50 | D: 61 |
| Crack resistance | | o | o | Δ | o | (on cooling) x |
| Adhesion to PPA | | o | o | o | Δ | Δ |

Example 4

An Example Using a Type (b) Component (A)

Using toluene as a solvent, the monomers phenyltrichlorosilane, vinyldimethylchlorosilane, and a dichlorodimethylsiloxane represented by an average composition formula: $Cl(Me_2SiO)_{17}Cl$ were added to the solvent in a molar ratio of 55:20:25 (wherein the quantity of the dichlorodimethylsiloxane was calculated as $Me_2SiO$ units), and following cohydrolysis, a dehydrochlorination condensation was allowed to proceed at 150° C. for 30 minutes, yielding a 50% toluene solution of the non-volatile fraction. 0.05 g of a 50% aqueous solution of KOH was added per 100 g of solid fraction within the toluene solution, and following conducting a dehydration

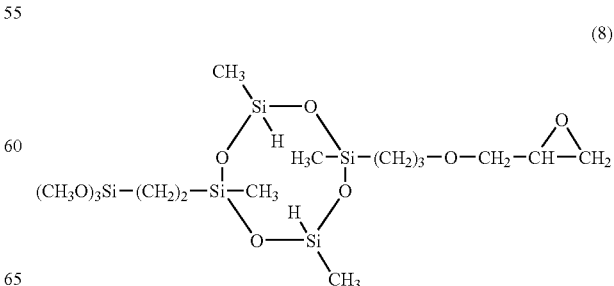

To this liquid mixture was added a platinum complex catalyst containing divinyltetramethyldisiloxane ligands, in sufficient quantity to provide 10 ppm (on a mass basis) of platinum atoms, and the mixture was then stirred to generate a uniform composition.

The composition was cured by heating at 100° C. for one hour and then at 150° C. for a further one hour, thus yielding a colorless, transparent resin-like cured product.

The Shore D hardness was measured at 68.

Example 5

An Example Using a Type (b) Component (A)

With the exception of altering the monomers subjected to hydrolysis to a mixture of phenyltrichlorosilane, vinyldimethylchlorosilane, dimethyldichlorosilane, and a dichlorodimethylpolysiloxane represented by an average composition formula: $Cl(Me_2SiO)_{17}Cl$ in a molar ratio of 55:20:12.5:12.5 (wherein the quantity of the dichlorodimethylpolysiloxane was calculated as $Me_2SiO$ units), a composition was prepared in the same manner as the example 4, and curing of this composition under the same conditions yielded a colorless, transparent resin-like cured product. The Shore D hardness was measured at 64.

Comparative Example 3

With the exception of not subjecting the 50% by mass toluene solution obtained following cohydrolysis and dehydrochlorination condensation to the dehydration condensation using KOH, but rather immediately subjecting the solution to stripping at 80° C. and 15 mmHg, a composition was prepared in the same manner as the example 4, and curing of this composition under the same conditions yielded a colorless, transparent resin-like cured product. The Shore D hardness was measured at 58.

Comparative Example 4

With the exception of altering the monomers subjected to hydrolysis to a mixture of phenyltrichlorosilane, vinyldimethylchlorosilane, and dimethyldichlorosilane in a molar ratio of 55:20:25, a composition was prepared in the same manner as the example 4, and curing of this composition under the same conditions yielded a colorless, transparent resin-like cured product. The Shore D hardness was measured at 60.

Comparative Example 5

Instead of conducting a cohydrolysis in toluene of the chlorosilanes and dichlorodimethylsiloxane as in the example 4, 28 g of water was added to 200 g of a mixture of phenyltrimethoxysilane, vinylmethyldiethoxysilane, and a dimethylsiloxanediol represented by an average composition formula: $HO(Me_2SiO)_{17}H$ in a molar ratio of 55:20:25 (wherein the quantity of the dimethylsiloxanediol was calculated as dimethylsiloxane units), and a cohydrolysis was then conducted using 3.4 g of methanesulfonic acid as a catalyst. The thus obtained polymer toluene solution was then treated in the same manner as the example 4 from the step of adding the KOH aqueous solution and conducting a dehydration condensation, thereby yielding a solution of an organopolysiloxane with an average composition, based on the added siloxane units, represented by the formula: $(C_6H_5)_{0.55}(CH_2\!=\!\!CH)_{0.2}(CH_3)_{0.9}SiO_{1.08}$. Subsequent operations were also conducted in the same manner as the example 4 to complete preparation of a composition, and curing of this composition under the same conditions yielded a colorless, transparent resin-like cured product. The Shore D hardness was measured at 60.

Evaluations

The crack resistance and adhesion of the compositions obtained in the examples 4 and 5, and the comparative examples 3 to 5 were evaluated using the methods described above. The results are shown in Table 2 and Table 3.

TABLE 2

|  | Example 4 | Example 5 | Comparative example 3 | Comparative example 4 |
| --- | --- | --- | --- | --- |
| Phenyltrichlorosilane (mol %) | 55 | 55 | 55 | 55 |
| Vinyldimethylchlorosilane (mol %) | 20 | 20 | 20 | 20 |
| $Cl(Me_2SiO)_{17}Cl$ ($Me_2SiO$ units mol %) | 25 | 12.5 | 25 |  |
| Dimethyldichlorosilane (mol %) |  | 12.5 |  | 25 |
| Condensation | Yes | Yes | No | Yes |
| Hardness (Shore D) | 68 | 64 | 58 | 60 |
| Crack resistance | ○ | ○ | X (at −40° C.) | X (at −40° C.) |
| Adhesion to PPA | ○ | ○ | ○ | ○ |

TABLE 3

|  | Comparative example 5 |
| --- | --- |
| Phenyltrimethoxysilane (mol %) | 55 |
| Vinylmethyldiethoxysilane (mol %) | 20 |
| $HO(Me_2SiO)_{17}H$ ($Me_2SiO$ units mol %) | 25 |
| Condensation | Yes |
| Hardness (Shore D) | 46 |
| Crack resistance | X (at −40° C.) |
| Adhesion to PPA | ○ |

INDUSTRIAL APPLICABILITY

An addition curable silicone resin composition of the present invention is useful as a material for light emitting diode elements and other optical devices or optical components. In other words, a cured product of the composition is useful as any of a variety of optical materials, including optical devices, sealing materials for optical components, lens materials and display materials, as well as electronic devices, insulating materials for electronic components, and coating materials.

More specifically, the composition can be used favorably as a material for protecting or sealing light emitting diodes, as an adhesive for bonding structural components or structural members such as elements or optical devices that use such elements, either to one another or to substrates, as a material for altering or regulating the wavelength of light emitted from light emitting diode elements, as a structural material for members or components that require favorable optical transparency such as lenses, or as an adhesive for such members or components.

What is claimed is:

1. An addition curable silicone resin composition for a light emitting diode, comprising:

(A) an organopolysiloxane comprising:
a straight-chain segment represented by a general formula (1):

$$-(R^1_2SiO)_n- \qquad (1)$$

wherein $R^1$ represents an unsubstituted or substituted monovalent hydrocarbon group that contains no unsaturated aliphatic bonds, and n represents an integer of from 7 to 100), and a resin-like segment, consisting of M units represented by a general formula:
$R^2_3SiO_{1/2}$ wherein $R^2$ represents an unsubstituted or substituted monovalent hydrocarbon group, an alkoxy group, or a hydroxyl group, and at least one member of Q units represented by a formula: $SiO_2$, and T units represented by a formula: $R^2SiO_{3/2}$ wherein $R^2$ is as defined above, in which at least two of all said $R^2$ groups are alkenyl groups, wherein, in said component (A), said straight-chain segment and said resin-like segment exist within a single molecule and form a single organopolysiloxane molecule, (B) an organohydrogenpolysiloxane represented by an average composition formula (4):

$$R^3_aH_bSiO_{(4-a-b)/2} \qquad (4)$$

wherein, each $R^3$ represents, independently, an unsubstituted or substituted monovalent hydrocarbon group that contains no alkenyl groups, at least 30 mol % of all $R^3$ groups are methyl groups, a is a number that satisfies $0.7 \leq a \leq 2.1$, b is a number that satisfies $0.001 \leq b \leq 1.0$, and a+b represents a number that satisfies $0.8 \leq a+b \leq 3.0$, and contains at least two hydrogen atoms bonded to silicon atoms within each molecule, in sufficient quantity that a ratio of silicon atom-bonded hydrogen atoms within said component (B) relative to all silicon atom-bonded alkenyl groups within said component (A) is within a range from 0.5 to 4.0, (C) an effective quantity of an addition reaction catalyst, and (D) an organohydrogenpolysiloxane compound containing at least one of an epoxy group and an alkoxy group, in sufficient quantity to provide from 0 to 30 parts by mass per 100 parts by mass of a combination of said component (A) and said component (B).

2. The composition according to claim 1, wherein in said resin-like segment, a molar ratio of [M units]/ [Q units and/or T units] is within a range from 0.5 to 1.2.

3. The composition according to claim 1, wherein in said component (A), a proportion of D units represented by a formula: $R^1_2SiO$ within all siloxane units is within a range from 10 to 80 mol %.

4. The composition according to claim 1, wherein in said component (A), a quantity of alkenyl groups within said $R^2$ groups is within a range from 0.01 to 1.0 mol per 100 g of said component (A).

5. The composition according to claim 1, wherein 80 mol % or more of all organic substituent groups bonded to silicon atoms within said component (A) are methyl groups.

6. The composition according to claim 1, wherein from 0 to 75 mol % of all organic substituent groups bonded to silicon atoms within said component (A) are phenyl groups.

7. The composition according to claim 1, wherein a quantity of hydrogen atoms bonded to silicon atoms within said component (B) is within a range from 0.001 to 0.02 mol/g.

8. A light emitting diode sealed with a cured product of an addition curable silicone resin composition according to claim 1.

9. The composition according to claim 1, wherein the component (A) is prepared by hydrolysis and polymerization of an α,ω-dichlorodiorganopolysiloxane represented by the formula $$Cl(R^1_2SiO)_{n-1}Si(R^1)_2Cl$$

wherein $R^1$ is as defined in relation to the general formula (1), and n represents an integer from 7 to 100; a triorganochlorosilane; and at least one of an organotrichlorosilane and tetrachlorosilane.

10. The composition according to claim 9, wherein in said resin-like segment, a molar ratio of [M units]/ [Q units and/or T units] is within a range from 0.5 to 1.2.

11. The composition according to claim 9, wherein in said component (A), a proportion of D units represented by a formula: $R^1_2SiO$ within all siloxane units is within a range from 10 to 80 mol %.

12. The composition according to claim 9, wherein in said component (A), a quantity of alkenyl groups within the $R^2$ groups is within a range from 0.01 to 1.0 mol per 100 g of said component (A).

13. The composition according to claim 9, wherein 80 mol % or more of all organic substituent groups bonded to silicon atoms within said component (A) are methyl groups.

14. The composition according to claim 9, wherein from 0 to 75 mol % of all organic substituent groups bonded to silicon atoms within said component (A) are phenyl groups.

15. The composition according to claim 9, wherein a quantity of hydrogen atoms bonded to silicon atoms within said component (B) is within a range from 0.001 to 0.02 mol/g.

16. A light emitting diode sealed with a cured product of an addition curable silicon resin composition according to claim 9.

17. The composition according to claim 1, wherein component (D) is present in an amount of from 3 to 15 parts by mass per 100 parts by mass of component (A).

18. The composition according to claim 1, wherein component (C) is present in an amount of no greater than 50 ppm.

* * * * *